United States Patent [19]
Kohmoto et al.

[11] 4,344,689
[45] Aug. 17, 1982

[54] LOCKING MECHANISM IN DIAPHRAGM SETTING RING OF SLR CAMERA

[75] Inventors: Shinsuke Kohmoto; Yasuyuki Haneishi, both of Tokyo, Japan

[73] Assignee: Asahi Kogaku Kogyo Kabushiki Kaisha, Tokyo, Japan

[21] Appl. No.: 237,986

[22] Filed: Feb. 25, 1981

[30] Foreign Application Priority Data

Feb. 25, 1980 [JP] Japan .............................. 55-24144[U]

[51] Int. Cl.³ .......................... G03B 17/00; G02B 7/02
[52] U.S. Cl. ..................................... 354/286; 350/257
[58] Field of Search ................. 354/46, 286, 289, 197, 354/295, 47, 270, 271, 273, 43, 44; 352/142, 231; 350/252, 257

[56] References Cited

U.S. PATENT DOCUMENTS 3,864,707  2/1975  Shirasaki ............................ 354/46 X
4,199,248  4/1980  Schlapp ................................. 354/286

Primary Examiner—Richard A. Wintercorn
Assistant Examiner—William B. Perkey
Attorney, Agent, or Firm—Christie, Parker & Hale

[57] ABSTRACT

A camera has a camera body, an interchangeable lens engageable with the camera body, and a rotatable diaphragm setting ring on the lens. A first mounting member on the camera body interlocks with a second mounting member on the lens to engage the lens with the camera body. A hole is formed in the second mounting member adjacent to the first mounting member and a slideable lock pin is disposed in the hole. The ring is rotatable between an automatic diaphragm control position and a range of diaphragm preset positions. Responsive to the diaphragm setting ring, the pin is retracted to a position approximately flush with the surface of the second mounting member when the diaphragm setting ring is within the range of diaphragm preset positions and the lock pin is extended outwardly from the surface of the second mounting member to the region occupied by the first mounting member when the diaphragm setting ring is at the automatic diaphragm control position. In camera bodies with automatic diaphragm control, the first mounting member has a recess aligned with the hole in the second mounting member to receive the pin in its extended position. In camera bodies without automatic diaphragm control, the first mounting member has a surface abutting the hole in the second mounting member to prevent the lock pin from extending therefrom, thereby blocking rotation of the diaphragm setting ring into the automatic diaphragm control position.

13 Claims, 5 Drawing Figures

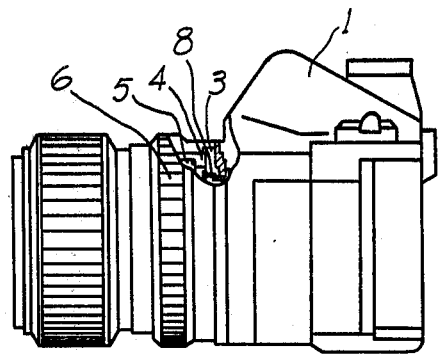
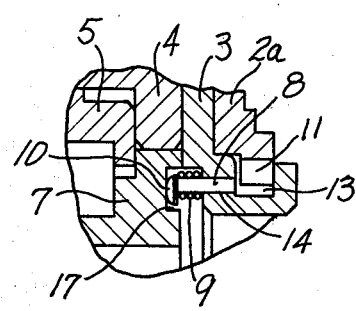
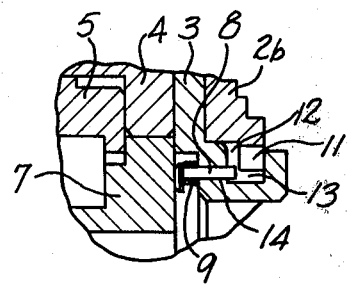
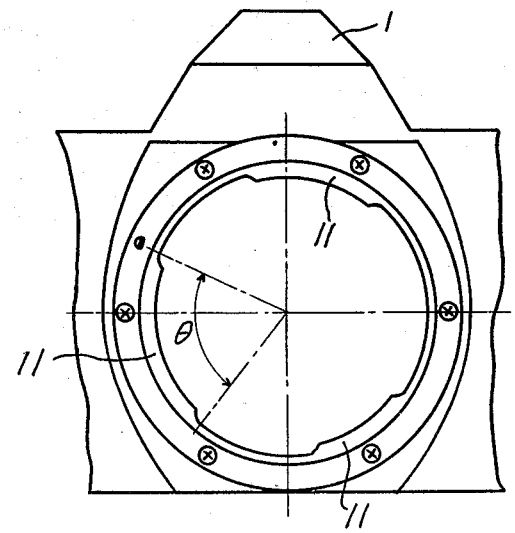
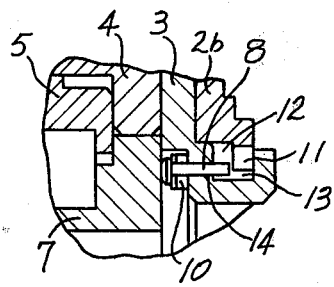

LOCKING MECHANISM IN DIAPHRAGM SETTING RING OF SLR CAMERA

CROSS REFERENCE TO RELATED APPLICATIONS

This application is related to application Ser. No. 237,987, filed on even date herewith by Zenichi Okura, Yasuyuki Haneishi, and Shinsuki Kawamoto entitled "Electrical Contact Arrangement for Photographic Camera with Interchangeable Lenses", the disclosure of which is incorporated herein fully by reference.

BACKGROUND OF THE INVENTION

This invention relates to single-lens reflex cameras with interchangeable lenses and, more particularly, to an interlocking mechanism for such camera.

A photographic camera incorporating an exposure meter is well known. A desired diaphragm value is selected and preset by operation of a diaphragm preset ring, and then a shutter speed based on the preset value is read from the exposure meter in the camera body so that on the basis of the selected diaphragm value an exposure value in the form of a shutter speed is given as the photometric result of said exposure meter. As an improvement of such photographic camera with exposure meter, so-called automatic exposure control cameras of diaphragm priority type are already commercially available. After a desired diaphragm value has been preset by operation of the diaphragm preset ring, an exposure time of the shutter which is actuated simultaneously with the shutter release is automatically controlled on the basis of an arithmetic result provided from an exposure control circuit according to said preset diaphragm value. Said photographic camera incorporated with the exposure meter and the last-mentioned photographic camera in which the exposure time of the shutter is automatically controlled will be hereinafter generally referred to, for convenience of description, simply as ES camera.

The photographic camera similarly incorporated with the exposure meter but of another type is also well known, in which, instead of presetting a desired diaphragm value, a desired shutter speed and therefore a desired exposure time is preset to avoid blur of the image or movement of hands when an object to be photographed is moving or relatively dark, and then a diaphragm value for proper exposure is read from the exposure meter incorporated in the camera body on the basis of said preset shutter speed value of exposure time value so that the diaphragm is set to this value read from the exposure meter immediately before photographing is actually done. As an improvement of such photographic camera, the so-called automatic exposure control camera of shutter priority type has already been available for many years. In this type of camera, a desired shutter speed is preset and the lens aperture is automatically stopped down on the basis of an arithmetic result provided by the exposure control circuit according to said preset shutter speed when the shutter is actuated by the shutter release. The photographic camera with exposure meter as mentioned in this paragraph and the last-mentioned photographic camera of which the lens aperture is automatically stopped down for the desired exposure control will be hereinafter generally referred to, for convenience of description, simply as EE camera.

A series of such developments to achieve photographing with proper exposure has recently resulted in realization of a photographic camera functioning as both ES camera and EE camera, and correspondingly interchangeable lenses adapted for these both functions have also been proposed. With such interchangeable lenses thus adapted for both ES camera and EE camera, a proper changeover between said two functions in actual use and an operation of this changeover must be as simple as possible. For said operation of changeover, a diaphragm preset ring of each interchangeable lens is provided over a limited angular range therearound not only with graduations for diaphragm presetting but also with a separate set marking for EE camera so that the diaphragm preset ring may be rotated to said separate set marking to adapt the interchangeable lenses for EE camera. In the description of the present invention, the diaphragm preset ring including said set marking for EE camera will be referred to as a diaphragm setting ring.

The interchangeable lenses adapted for both ES camera and EE camera realized through a series of developments as mentioned above have not always been used with a new model of camera having said both types of automatic exposure control function but often used with a photographic camera having automatic exposure control function of either of said two types or a photographic camera of relatively old type with exposure meter.

In this situation, erroneous use of the interchangeable lens with respect to the type of photographic camera on which this interchangeable lens is to be mounted will prevent photographing with proper exposure.

When an interchangeable lens adapted for both ES camera and EE camera is mounted on and used with EE camera, the diaphragm setting ring is rotatably aligned with the automatic diaphragm control position so that the camera automatically performs a desired exposure control and stops down the interchangeable lens mounted on the camera to a proper value. However, unintentional rotation of the diaphragm setting ring out of the automatic diaphragm control position will make the automatic control function of the diaphragm difficult. As a countermeasure to this problem, there have already been proposed various lock mechanisms which hold the diaphragm setting ring at the automatic diaphragm control position and prevent said ring from being displaced out of said position, once the diaphragm setting ring has been set to said position. This means that, when the lens having its setting ring remaining at the automatic diaphragm control position is mounted on an ES camera, the lock mechanism must be unlocked and thereafter the diaphragm setting ring must be properly adjusted to change over the lens from this state to the automatic exposure of diaphragm priority mode. Photographing without such preliminary adjustment will result in an improper exposure. Rotating the diaphragm setting ring from the automatic diaphragm control position to the diaphragm value presetting range and vice versa for change over of the operation between the two functions without relying upon the lock mechanism would require a complicated construction. For example, a pin operatively associated with the diaphragm should be moved together with the diaphragm setting ring within the normal diaphragm value presetting range, while said pin should not follow the movement of the diaphragm setting ring when the latter moves from said normal diaphragm value presetting range to the automatic diaphragm control position, namely, only the diaphragm setting ring should move. This would require an increased number of parts which could not be easily incorporated into a limited space.

SUMMARY OF THE INVENTION

According to the invention, a camera having a camera body, an interchangeable lens engageable with the camera body, and a rotatable diaphragm setting ring on the lens is provided with a simplified interlock mechanism, which prevents the lens from being engaged with the camera body when the lens is set in its automatic diaphragm position. A first mounting member on the camera body interlocks with a second mounting member on the lens to engage the lens with the camera body. A hole is formed in the second mounting member adjacent to the first mounting member and a slideable lock pin is disposed in the hole. The ring is rotatable between an automatic diaphragm control position and a range of diaphragm preset positions. Responsive to the diaphragm setting ring, the pin is retracted to a position approximately flush with the surface of the second mounting member when the diaphragm setting ring is within the range of diaphragm preset positions and the lock pin is extended outwardly from the surface of the second mounting member to the region occupied by the first mounting member when the diaphragm setting ring is at the automatic diaphragm control position. In camera bodies with automatic diaphragm control, the first mounting member has a recess aligned with the hole in the second mounting member to receive the pin in its extended position. In camera bodies without automatic diaphragm control, the first mounting member has a surface abutting the hole in the second mounting member to prevent the lock pin from extending therefrom, thereby blocking rotation of the diaphragm setting ring into the automatic diaphragm control position.

A feature of the invention when the first and second mounting members are respectively bayonet claws and grooves, is to form the recess by a reduction in thickness of the bayonet claw in the region of the hole. This facilitates the implementation of the interlock mechanism.

BRIEF DESCRIPTION OF THE DRAWING

The features of specific embodiments of the best mode contemplated of carrying out the invention are illustrated in the drawing, in which:

FIG. 1 is a side elevation view of an SLR camera with interchangeable lens, partially broken away to show the interconnection between lens and camera body;

FIG. 2 is a side-sectional view of part of the camera of FIG. 1 illustrating an interlock mechanism incorporating principles of the invention in a camera body without automatic diaphragm control;

FIG. 3 is a side-sectional view of part of the camera of FIG. 1 illustrating the interlock mechanism of FIG. 2 in a camera body with automatic diaphragm control;

FIG. 4 is a front view of a camera body showing the mounting member and the mounting range of the camera body; and FIG. 5 is a side-sectional view illustrating an alternative embodiment of an interlocking mechanism incorporating principles of the invention.

DETAILED DESCRIPTION OF THE SPECIFIC EMBODIMENTS

According to the present invention, a general inconvenience leading to such complicated construction is eliminated and a simplified construction is employed. The pin operatively associated with the diaphragm is normally rotatable integrally with the diaphragm setting ring so that it is impossible to rotate the diaphragm setting ring towards the automatic diaphragm control position when an interchangeable lens has been mounted on an ES camera and it is also impossible to mount said lens to the ES camera if the diaphragm setting ring has previously been set to the automatic diaphragm control position, to avoid failures in photographing such as improper exposure due to erroneous operation. This feature of the present invention provides also another possibility that the function changeover can be achieved by rotating the diaphragm setting ring selectively to the diaphragm value presetting range and the set marking when the interchangeable lens has been mounted on the photographic camera functioning as both ES camera and EE camera.

Referring to these FIGS., 2a and 2b designate mounts of ES camera and EE camera, respectively, and 3 designates a bayonet ring of an interchangeable lens. 4 designates a joint ring to join the bayonet ring 3 into a unitary structure with a fixed ring 5, and 7 designates a control ring provided integrally with a diaphragm setting ring 6, so that an adjustable rotation of the diaphragm setting ring 6 causes the control ring 7 to be rotated together with said diaphragm setting ring 6 with respect to a structure integrally constructed with the bayonet ring 3, the joint ring 4 and the fixed ring 5. Although the control ring 7 is shown as a separate member with respect to the diaphragm setting ring 6 for illustration of the construction, it is of course possible to provide this control ring 7 as a single piece common to said diaphragm setting ring 6 in view of its function. The control ring 7 is provided in its end facing ring 3 with a circular groove 17 extending over an arc segment corresponding to the angular range of preset diaphragm value positions from a fully opened diaphragm value to a fully closed diaphragm value to a fully closed diaphragm value of the associated lens marked around the diaphragm setting ring 6 with respect to the optical axis so that said circular groove 17 is opposed to the end surface of the bayonet ring 3. The bayonet ring 3 has a small opening 14 through which a lock pin 8 is slideably inserted so that an inner end of said lock pin 8 is engaged in the circular groove 17 formed in said control ring 7. 9 designates a coil spring would around said lock pin 8 between a flange 10 formed on the lock pin 8 adjacent its inner end and the bayonet ring 3. Spring 9 normally biases lock pin 8 inwardly, i.e., toward ring 7. The ends of groove 17 are inclined to facilitate disengagement of lock pin 8 therefrom as ring 6 is set in the automatic exposure position.

11 designates a bayonet claw extending in the direction of the optical axis from a mount portion of camera body 1 and which has a thickness equal to or slightly smaller than the width of an engaging groove 13 formed in the bayonet ring 3 in the case where an interchangeable lens is mounted on the body of an ES camera. In the case of an EE camera or a camera which can function as both ES camera and as EE camera, the bayonet claw 11 extending from the mount 2b is provided in its surface opposed to an outer end surface of the lock pin 8 with a recess 12 or the bayonet claw 11 itself is formed correspondingly thinner to provide said recess 12 so that said recess 12 has a depth equal to or slightly smaller than the depth of the circular groove 17, as seen from FIG. 3.

When an interchangeable lens has been mounted on an ES camera, the inner end of the lock pin 8 is held engaged in the circular groove 17 under the biasing effect of the coil spring 9 during rotation of the diaphragm setting ring 6 no matter which diaphragm value is selectively set on the diaphragm value graduations from a fully opened diaphragm value to a fully closed diaphragm value marked around the diaphragm setting ring 6 of this interchangeable lens. When the diaphragm setting ring 6 is rotated into alignment with an index mark indicating the position of automatic diaphragm control located on one side or the other of the region over which said diaphragm value graduations extend with corresponding index marks, circular groove 17 moves relative to lock pin 8 until the end surface of control ring 7 contacts the inner end of the lock pin 8, i.e., lock pin 8 comes out of the circular groove 17, thereby urging lock pin 8 to protrude outwardly from ring 3 against the resilient force of the coil spring 9. In the case of an ES camera having an interchangeable lens mounted thereon, however, the outer end surface of the lock pin 8 is immediately brought into engagement with the bayonet claw 11 and thereby prevented from projecting outward so that it is impossible, in fact, to rotate the diaphragm setting ring 6 beyond the region over which the diaphragm value graduations extend, i.e., to rotate ring 6 to the automatic diaphragm control setting. Accordingly, once an interchangeable lens has been mounted on an ES camera, the diaphragm setting ring 6 will be effectively prevented from being brought to the automatic diaphragm control position if it is tried. If the diaphragm setting ring 6 has already been set to this automatic diaphragm control position before the interchangeable lens is mounted on the camera body of an ES camera, the lock pin 8 projects outwardly against the resilient force of the coil spring 9 by the end surface of the control ring 7. With the lock pin 8 this projecting outwardly, it is impossible to engage the bayonet ring 3 with the bayonet claw 11 of the camera body 1 and, in fact, no interchangeable lens can be mounted on the camera body. The user of the camera is thus informed of erroneous operation.

On the other hand, when an interchangeable lens is to be mounted on an EE camera or a camera functioning as both EE camera and ES camera and even if the diaphragm setting ring 6 has already been set to the automatic diaphragm control position so that the lock pin 8 projects outwardly as seen from FIG. 3, the quantity by which the outer end of this lock pin 8 projects is accommodated by the recess 12 formed in the claw 11 extending from the mount 2b and it is possible to engage the lock pin 8 with the claw 11 by utilizing the bayonet ring 3. If the angular or rotational position of the diaphragm setting ring 6 of an interchangeable lens to be mounted on the camera is within the area over which the diaphragm value graduations for diaphragm presetting operation lie, the lock pin 8 has its inner end within the circular groove 17 and its outer end not projecting out of the end surface of the bayonet ring 3, as seen from FIG. 2 so that the interchangeable lens can be easily mounted on the camera body without any obstruction. Further rotation of the diaphragm setting ring 6 from said diaphragm preset range to the automatic diaphragm control position causes the inner end of the lock pin 8 to be disengaged from the circular groove 17 and urged against the end surface of said control ring 7 with the result that the outer end of the lock pin 8 projects out of the bayonet ring 3. However, the quantity of such projection is accommodated by the recess 12 formed in the claw 11 so that the conversion from the automatic exposure control in the diaphragm presetting mode to the automatic exposure control in the shutter speed presetting mode can be achieved simply by rotation of the diaphragm setting ring 6, and the reverse conversion is also possible.

Another embodiment of the present invention shown by FIG. 5 will now be considered. According to this mode of realization, the coil spring 9 used in the embodiment of FIGS. 2 and 3 is replaced by a leaf spring 10 as the resilient member to bias the lock pin 8 inwardly. Similar parts are designated by reference numerals common to those in FIGS. 2 and 3. In this embodiment also, the lock pin 8 is biased by the leaf spring 10 to the circular groove 17 at its inner end when the diaphragm setting ring 6 is adjustably rotated with the angular range of the diaphragm value graduations according to the diaphragm presetting mode, while the inner end of the lock pin 8 bears against the end surface of the control ring 7 so as to project at the outer end as seen from FIG. 5 when the diaphragm setting ring 6 is rotated to the automatic diaphragm control position. The projecting portion of pin 8 is accommodated by the recess 12 formed in the bayonet claw 11.

It will be clear from the foregoing description that, in accordance with the present invention, there is provided a lock mechanism in the diaphragm setting ring of an interchangeable lens in which a control ring 7 integral with the diaphragm setting ring 6 is provided with the circular groove 17 and a lock pin 8 is normally biased to retract towards the bayonet ring 3, for the camera functioning as an EE camera, in association with the claw 11 extending from the mount 2 thereof, said claw 11 being formed with the recess 12, resulting in that the diaphragm setting ring 6 is prevented from being erroneously rotated to the automatic diaphragm control position when an interchangeable lens has been mounted on a camera having no automatic diaphragm control function; that the desired changeover is achieved by operation of the diaphragm setting ring 6 when the interchangeable lens has been mounted on the camera having both automatic diaphragm control function and automatic exposure time control function; and that an interchangeable lens adapted for both ES camera and EE camera can be properly used with these cameras of different types. Formation of the recess 12 in the bayonet claw 11 extending from the mount of the camera body 1 requires no separate step of fabrication, namely, it can be easily accomplished in the same fabrication step as the ordinary bayonet claw 11 simply by deeper machining, without any deterioration of external appearance.

What is claimed is:
1. In a camera having a camera body, an interchangeable lens engageable with the camera body, and a rotatable diaphragm setting ring on the lens, the ring being rotatable between an automatic diaphragm control position and a range of diaphragm presetting positions, an improvement comprising:
 a first mounting member on the camera body;
 a second mounting member on the lens, the second mounting member interlocking with the first mounting member to engage the lens with the camera body;

a hole formed in the second mounting member adjacent to the first mounting member;

a slideable lock pin disposed in the hole;

means responsive to the diaphragm setting ring for retracting the pin to a position approximately flush with the surface of the second mounting member when the diaphragm setting ring is within the range of diaphragm presetting positions; and means responsive to the diaphragm ring for extending the lock pin outwardly from the surface of the second mounting member to the region occupied by the first mounting member when the diaphragm setting ring is at the automatic diaphragm control position.

2. The improvement of claim 1, in which the camera body has automatic diaphragm control and the first mounting member has a recess aligned with the hole in the second mounting member to receive the pin in its extended position.

3. The improvement of claim 1, in which the camera body has no automatic exposure control and the first mounting member has a surface abutting the hole in the second mounting member to prevent the lock pin from extending therefrom, thereby blocking rotation of the diaphragm setting ring into the automatic diaphragm control position.

4. The improvement of claim 1, in which the first mounting member comprises one or more bayonet claws and the second mounting element comprises one or more bayonet grooves corresponding to the respective one or more bayonet claws, the one or more claws fitting in the one or more grooves to engage the lens with the camera body.

5. The improvement of claim 4, in which the lock pin has an inner end within the lens and means for urging the lock pin into the hole of the second mounting member, the means for extending the lock pin comprises a control ring integral with the diaphragm setting ring, the control ring having an end surface against which the inner end of the lock pin is urged by the urging means, and the retracting means comprises a circular groove opposed to the inner end of the lock pin and extending over a segment of the end surface of the control ring corresponding to the range of preset diaphragm values.

6. The improvement of claim 5, in which the ends of the circular grooves are inclined.

7. The improvement of claim 5, in which the inner end of the lock pin has a head and the urging means comprises a coil spring disposed between the head and the second mounting member.

8. The improvement of claim 5, in which the inner end of the lock pin has a head and the urging means comprises a leaf spring disposed between the head and the second mounting member.

9. The improvement of claim 5, in which the camera body has automatic diaphragm control and the bayonet claw has a reduced recess forming thickness in a region aligned with the hole in the second mounting member to receive the pin in its extended position.

10. The improvement of claim 5, in which the camera body has no automatic exposure control and the bayonet claw has a thickness substantially the same as the width of the bayonet groove in the region aligned with the hole in the second mounting member to prevent the lock pin from extending from the second mounting member, thereby blocking rotation of the diaphragm setting ring into the automatic diaphragm control position.

11. A lock mechanism for a diaphragm setting ring of an interchangeable lens mounted on a single-lens reflex camera, said lock mechanism comprising a bayonet ring adapted to be engaged with a bayonet claw of a camera body, a lock pin inserted through said bayonet ring in the range of such engagement and biased from outside of said bayonet ring to be withdrawn inwardly, a diaphragm setting ring rotatable over an angular range defined by a diaphragm presetting range and an automatic diaphragm control position, and a circular groove extending over a circular range corresponding to said diaphragm presetting range and formed in a control ring adapted to be rotated together with said diaphragm setting ring, wherein said bias effect on the lock pin forces the inner end of said lock pin into said circular groove and thereby forces the outer end of said pin against said bayonet claw when the diaphragm setting ring is within the diaphragm presetting range; and rotation of the diaphragm setting ring causes a side end surface of said control ring to move the circular groove to disengage the inner end of the lock pin and thereby to force the outer end of said lock pin projecting outwards but this projection is prevented, when the interchangeable lens has been mounted on the camera body of a camera having no automatic diaphragm control function, by bearing of the lock pin against the bayonet claw of this camera body while an extent of this projection is accommodated by a recess formed in the bayonet claw when the interchangeable lens has been mounted on the camera body of a camera having the automatic diaphragm control function.

12. A lock mechanism according to claim 11, wherein the bias effect on the lock pin is provided by a coiled spring wound around said lock pin between a flange formed on the inner end of said pin and the bayonet ring.

13. A lock mechanism according to claim 11, wherein the bias effect on the lock pin is provided by a leaf spring disposed across the flange formed on the inner end of said pin and the bayonet ring.

* * * * *